United States Patent
Kmoch et al.

(10) Patent No.: US 9,505,156 B2
(45) Date of Patent: Nov. 29, 2016

(54) MOLD STACK HAVING A FLOATING CAVITY INSERT

(71) Applicant: HUSKY INJECTION MOLDING SYSTEMS LTD., Bolton (CA)

(72) Inventors: Sven Kmoch, Platten (DE); Ralf Walter Fisch, Saarburg (DE)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 0 days.

(21) Appl. No.: 14/764,223

(22) PCT Filed: Jan. 21, 2014

(86) PCT No.: PCT/CA2014/050041
§ 371 (c)(1),
(2) Date: Jul. 29, 2015

(87) PCT Pub. No.: WO2014/131118
PCT Pub. Date: Sep. 4, 2014

(65) Prior Publication Data
US 2015/0360404 A1    Dec. 17, 2015

Related U.S. Application Data

(60) Provisional application No. 61/769,852, filed on Feb. 27, 2013.

(51) Int. Cl.
*B29C 45/36* (2006.01)
*B29C 45/26* (2006.01)
*B29C 45/57* (2006.01)
*B29C 45/52* (2006.01)
*B29C 45/54* (2006.01)

(Continued)

(52) U.S. Cl.
CPC .............. *B29C 45/36* (2013.01); *B29C 45/261* (2013.01); *B29C 45/2675* (2013.01); *B29C 45/2606* (2013.01); *B29C 45/52* (2013.01); *B29C 45/54* (2013.01); *B29C 45/57* (2013.01); *B29C 2045/363* (2013.01); *B29K 2105/258* (2013.01); *B29L 2031/7158* (2013.01)

(58) Field of Classification Search
CPC ..... B29C 45/36; B29C 45/261; B29C 45/54; B29C 45/2606; B29C 45/57; B29C 45/52; B29C 2045/363; B29C 45/2675
USPC ....................................................... 425/533
See application file for complete search history.

(56) References Cited

U.S. PATENT DOCUMENTS 5,201,523 A * 4/1993 Miller ................. B29C 45/2606
473/378
5,736,173 A * 4/1998 Wright ..................... B29C 45/33
264/318

(Continued)

OTHER PUBLICATIONS

PCT International Search Report; Zhang, Pengfei; Apr. 10, 2014; 3 pages.

*Primary Examiner* — Alison L Hindenlang
*Assistant Examiner* — Emmanuel S Luk

(57) ABSTRACT

There is provided a mold stack (100). The mold stack comprises a cavity insert (110) configured to define a portion of a molding cavity (108) for defining a body portion of a preform to be molded therein, the cavity insert (110) positionable, in use, within a bore (113) in a cavity plate (114) in a loose fit arrangement, allowing for a degree of float, in a lateral direction, of the cavity insert (110) relative to the cavity plate (114).

9 Claims, 3 Drawing Sheets

(51) Int. Cl.
*B29K 105/00* (2006.01)
*B29L 31/00* (2006.01)

(56) References Cited

U.S. PATENT DOCUMENTS

| | | | | |
|---|---|---|---|---|
| 5,780,068 A | * | 7/1998 | Shinohara | B29C 45/263 |
| | | | | 425/168 |
| 7,566,216 B2 | * | 7/2009 | Kmoch | B29C 45/2711 |
| | | | | 425/549 |
| 7,568,906 B2 | * | 8/2009 | Kmoch | B29C 45/2711 |
| | | | | 425/547 |
| 7,628,605 B2 | * | 12/2009 | Mai | B29C 45/2606 |
| | | | | 249/178 |
| 7,645,132 B2 | | 1/2010 | McCready | |
| 7,762,802 B2 | * | 7/2010 | Mai | B29C 45/36 |
| | | | | 425/190 |
| 8,021,590 B2 | * | 9/2011 | Kuttappa | A63B 37/0003 |
| | | | | 264/277 |
| 8,727,766 B2 | * | 5/2014 | Hammond | B29C 45/278 |
| | | | | 425/549 |
| 9,004,906 B2 | * | 4/2015 | Lausenhammer | B29C 45/7312 |
| | | | | 425/522 |
| 9,248,595 B2 | * | 2/2016 | Schad | B29C 45/2711 |
| 2008/0268089 A1 | | 10/2008 | Kmoch et al. | |
| 2009/0022844 A1 | * | 1/2009 | Mai | B29C 33/76 |
| | | | | 425/577 |
| 2009/0166924 A1 | | 7/2009 | Kuttappa | |

\* cited by examiner

MOLD STACK HAVING A FLOATING CAVITY INSERT

FIELD OF THE INVENTION

The present invention relates, generally, to injection molding systems. More particularly, the invention relates to a mold stack having a floating cavity.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethylene terephthalate (PET) material is a preform that is capable of being subsequently blown into a beverage container, such as, a bottle and the like.

A typical molding system includes an injection unit, a clamp assembly and a mold assembly. The injection unit can be of a reciprocating screw type or of a two-stage type. The clamp assembly includes inter alia a frame, a movable platen, a fixed platen and an actuator for moving the movable platen and to apply tonnage to the mold assembly arranged between the platens. The mold assembly includes inter alia a cold half and a hot half. The hot half is usually associated with one or more cavities (and, hence, also sometimes referred to by those of skill in the art as a "cavity half"), while the cold half is usually associated with one or more cores (and, hence, also sometimes referred to by those of skill in the art as a "core half"). The one or more cavities together with one or more cores define, in use, one or more molding cavities. The hot half can also be associated with a melt distribution system (also referred to sometimes by those of skill in the art as a "hot runner") for melt distribution. The mold assembly can be associated with a number of additional components, such as neck rings, neck ring slides, ejector structures, wear pads, etc.

As an illustration, injection molding of PET material involves heating the PET material (ex. PET pellets, PEN powder, PLA, etc.) to a homogeneous molten state and injecting, under pressure, the so-melted PET material into the one or more molding cavities defined, at least in part, by the aforementioned one or more cavities and one or more cores mounted respectively on a cavity plate and a core plate of the mold assembly. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core. Accordingly, by urging the core plate away from the cavity plate, the molded article can be demolded, i.e. ejected from the core piece. Ejection structures are known to assist in removing the molded articles from the core halves. Examples of the ejection structures include stripper plates, ejector pins, etc.

An injection mold for making preforms (and other molded articles) typically includes one or more molding cavities for receiving molten resin and forming the preforms. To increase the flexibility of the molding assembly, interchangeable inserts can be inserted into bores in a cavity plate. FIG. 1 shows a portion of a prior art injection molding machine 10. One or more mold cavities 12 are usually defined between complementary shaped, generally cylindrical cavity inserts 14 and core inserts 15 that are arranged within bores (not separately numbered) defined in a cavity plate 16. The mold cavities 12 are aligned generally parallel to the direction of mold-clamping action (i.e., the mold-clamping axis).

For molded articles that have threaded neck portions, a split neck ring (not shown) cooperates with the core insert 15 to create the neck. A taper is typically provided at an end of the cavity insert 14 (also not shown) to help align the neck ring.

A hot runner assembly 18 communicates a flow of molten resin to melt channels 19 in one or more nozzle assemblies 20. A gate insert 22 is seated within the mold cavity inserts 14. A first profiled surface 24 on the gate insert 22 defines a receptacle to house the tip of the nozzle assembly 20. A second profiled surface 26 on the gate insert 22 defines a portion of the mold cavity 12. A gate 28 is provided in the gate insert 22 which provides fluid communication between each of the nozzle assemblies 20 and each of the mold cavities 12. Gate 28 is open or closed by a valve pin 29. Other types of gating, such as slide valves or thermal gating can also be used The molten resin that is injected into the cavities must be cooled to solidify the resin so that the molded preform can be removed from the mold cavity 12. It is desirable to cool the preform as quickly as possible so the preforms can be removed and a next injection cycle initiated with minimal time delay. To this effect, cooling channels 30 are typically provided in the cavity inserts 14 and gate inserts 22. A cooling fluid, such as water, is circulated through the cooling channels 30.

SUMMARY

According to a first broad aspect of the present invention, there is provided a mold stack. The mold stack comprises a cavity insert configured to define a portion of a molding cavity for defining a body portion of a preform to be molded therein, the cavity insert positionable, in use, within a bore in a cavity plate in a loose fit arrangement, allowing for a degree of float, in a lateral direction, of the cavity insert relative to the cavity plate.

According to a second broad aspect of the present invention, there is provided a mold stack. The mold stack comprises a cavity plate defining at least one bore; at least one cavity insert positionable, in use, within the at least one bore, the at least one cavity insert and the bore being dimensioned in a loose fit arrangement to allow the cavity insert a degree of lateral float relative to the cavity plate.

DETAILED DESCRIPTION OF DRAWINGS

DETAILED DESCRIPTION OF THE EMBODIMENTS

Figure 2:
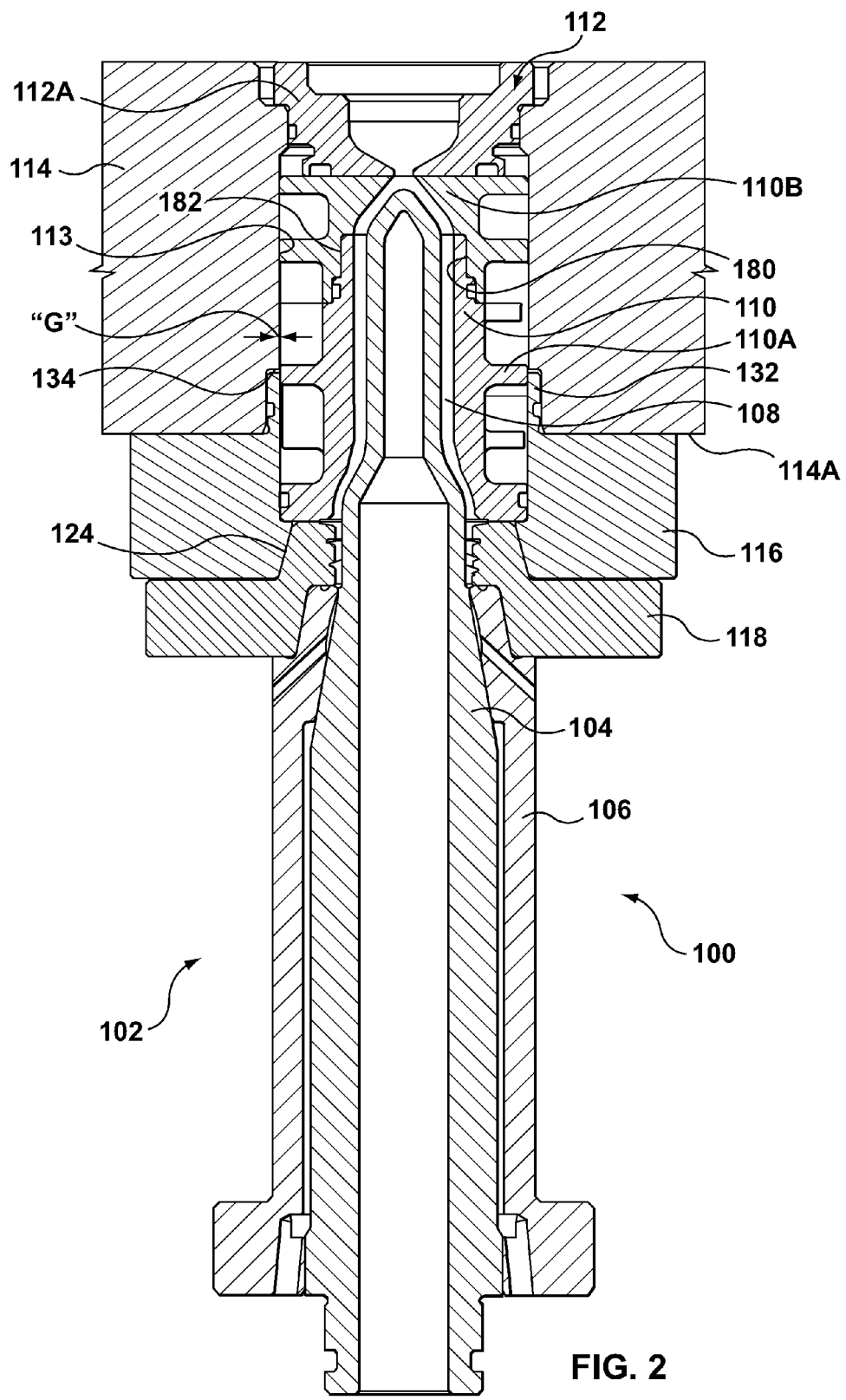
FIG. 2 shows a cross section view taken along an operational axis of a mold stack implemented in accordance with embodiments of the present invention.

With reference to FIG. 2, there is depicted a portion of a mold stack 100 according to a non-limiting embodiment of the present invention. The mold stack 100 comprises a core insert assembly 102, in use, associated with a core plate (not depicted). Within the depicted embodiments, the core insert assembly 102 comprises a core insert 104 and a lock ring 106. Generally speaking, the purpose of the core insert 104 is to define a portion of a molding cavity 108 and, more specifically, an inner surface of a preform (not depicted) to be formed within the molding cavity 108. It should be expressly understood that in alternative embodiments of the present invention, the core insert assembly 102 can be implemented as a unitary structure, as is well known in the art.

There is also provided a cavity insert 110 positionable in use within a bore 113 defined within cavity plate 114. Generally speaking, the purpose of the cavity insert 110 is to define a portion of a molding cavity 108 and, more specifically, an outer surface of a body portion of a preform (not depicted) to be formed within the molding cavity 108. Within the specific implementation of the cavity insert 110 depicted in FIG. 2, the cavity insert 110 is implemented in a two-piece configuration. To that extent, the cavity insert comprises a first cavity insert portion 110A and a second cavity insert portion 110B. However, in alternative non-limiting embodiments of the present invention, the cavity insert 110 can be implemented as a unitary structure.

Within the specific illustration of FIG. 2, there is also provided a gate insert 112. The gate insert 112 provides (i) an interface (not separately numbered) with a hot runner nozzle (not depicted) and (ii) an interface (not depicted, but also known as a "gate") for the flow of plastic material between the hot runner nozzle (not depicted) and the molding cavity 108.

Figure 3:
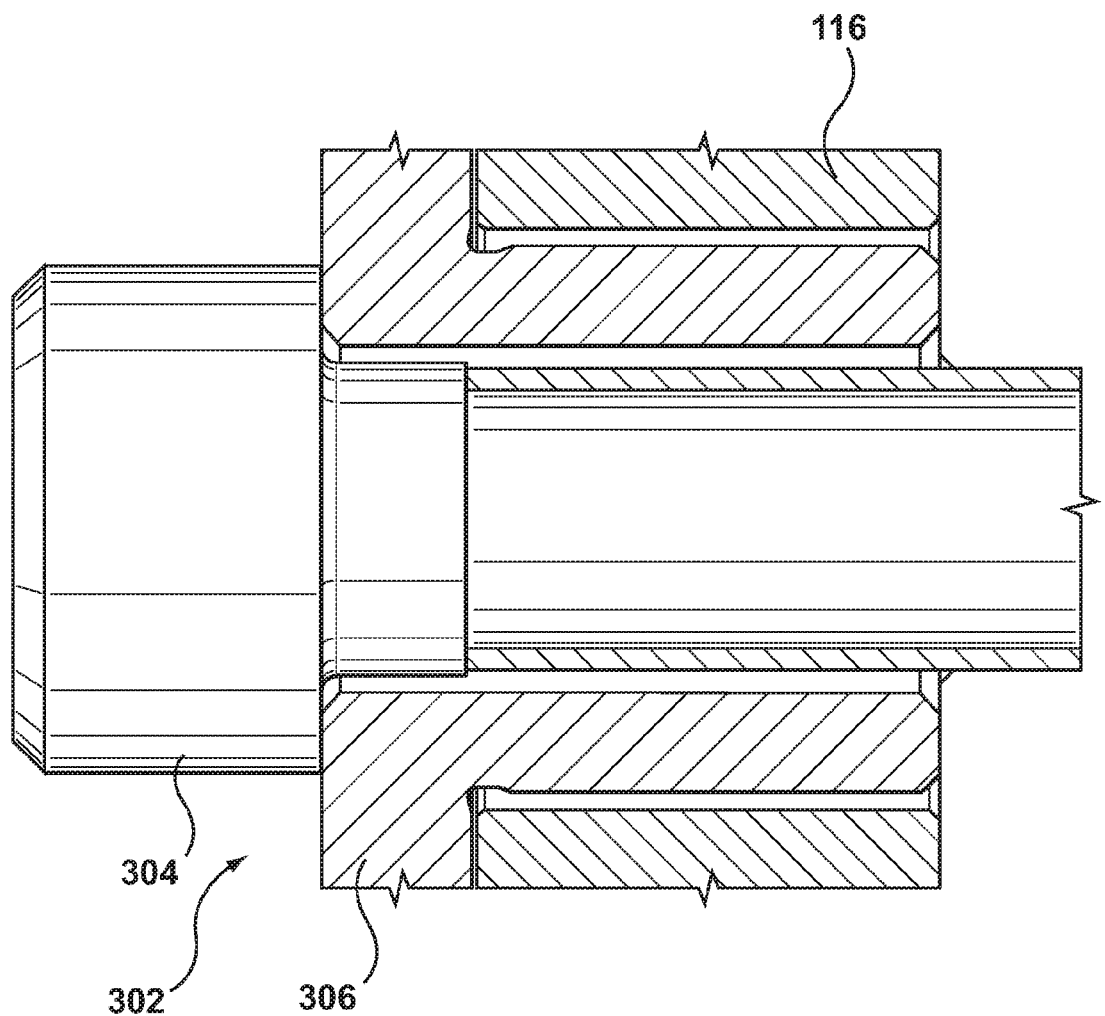
FIG. 3 depicts a cross section view taken long an operational axis of a portion of the mold stack of FIG. 2.

Also, there is provided a flange insert 116 in association with the cavity insert 110. More detailed explanation of the implementation of the cavity insert 110 and the flange insert 116 will be provided momentarily. In some embodiments of the present invention, the flange insert 116 is coupled to the cavity plate 114 by means of a floating retainer structure. An example of such flexible retainer structure is depicted at 302 in FIG. 3. The flexible retainer structure 302 comprises a screw 304 The screw 304 is positionable through a screw seat 306 that in turn is positionable within a bore (not numbered) defined within the flange insert 116. The screw 304, the screw seat 306 and a threaded bore (not depicted) defined in the cavity plate 114 are so sized to allow the flange insert 116 a degree of float within boundaries of a gap defined between the flexible retainer structure 302 and the cavity plate 114. The size of the gap, in some embodiments, can be between 0.005 mm and 0.04 mm.

In some embodiments of the present invention, the gate insert 112 can be implemented as a "floating gate insert". Such implementations are known in the art and, as such, will not be described here at any length. An example of such implementation can be found in the co-owned patent having a U.S. Pat. No. 7,566,216 and issued on Jul. 28, 2009.

Returning to the general construction of the mold stack 100, there is provided a split mold insert 118, also referred sometimes to by those of skill in the art as a "neck ring". Two split mold inserts 118 form a split mold insert pair. The function of the split mold inserts 118 is well known to those of skill in the art and, as such, need not be discussed here at any length.

Within the implementation of FIG. 2, there is provided an interface seat 180. The interface seat 180 is defined within the lower part (as seen in FIG. 2) of the second cavity insert portion 110B. On the other hand, the second cavity insert portion 110A is provided with a cavity insert end portion 182. The cavity insert end portion 182 is shaped complimentary to the seat 180. Such that, in use when assembled, the cavity insert end portion 182 is seated within the seat 180. The dimension of the cavity insert end portion 182 and the seat 180, as well as the associated tolerances, are selected such as to provide a controlled degree of float and controlled alignment, as will be described in greater detail herein below. It should be noted that the position of the interface seat 180 and the cavity insert end portion 182 can be reversed within the first cavity insert portion 110B and the second cavity insert portion 110B.

Within the non-limiting illustration of FIG. 2, the core insert assembly 102, the cavity insert 110, the gate insert 112, the flange insert 116 and the two split mold inserts 118 are depicted in a so-called "mold closed position". Within the mold closed position, a portion of the core insert assembly 102, a portion of the cavity insert 110, a portion of the gate insert 112 and a portion of each of the two split mold inserts 118 all cooperate to define the molding cavity 108.

A shape of the molding cavity 108 corresponds to a shape of a molded article to be molded therein. Within specific non-limiting embodiment depicted in FIG. 1, the molded article to be molded comprises a preform that is capable of being subsequently blow-molded into a final-shaped article, such as beverage container. However, it should be expressly understood that the molded article can be of any other shape and/or configuration. Accordingly, it should be clear that teachings of embodiments of present invention apply to a mold stack 100 and a molding system incorporating the mold stack 100 that can be configured to produce different types of molded articles, such as, but not limited to, preforms, thin wall containers, closures and the like.

Also provided within FIG. 2, is a first interface 124 defined between the split mold inserts 118 and the flange insert 116. In the specific embodiment illustrated, the first interface 124 comprises a pair of complementary tapers defined on the split mold inserts 118 and the flange insert 116.

According to embodiments of the present invention, the cavity insert 110 is implemented as a "floating cavity insert" and to that end, can be referred to, as a floating cavity insert 110. To that extent, the cavity insert 110 is positionable within the bore 113 in a "loose fit" relationship.

Put another way, there is provided a gap "G" between the cavity insert 110 and the walls of the bore 113. Just by way of an example, the cavity insert 110 may have a diameter of 29.7+/−0.025 mm and can be positionable within the bore 113 having a diameter of 30+/−0.025 mm. Cavity diameter can generally vary between 29.675 mm an 29.725 mm and the bore diameter can vary between 29.975 mm and 30.025 mm. As such, the "float" within the gap "G" can be in the range of between 0.125 mm and 0.175 mm. Put another way, the cavity insert 110 may have a freedom of movement of between 0.125 mm and 0.175 mm.

The gap "G" allows for a degree of float of the cavity insert 110 within the bore 113. By the term "float" present disclosure means to denote a degree of movement, as will be described in greater detail herein below.

According to embodiments of the present invention, the flange insert 116 comprises a flange member 132. The flange member 132 projects in a direction away from split mold inserts 118 or, in other words, towards the gate insert 112. Put yet another way, the flange member 132 projects in a direction away from a mold face 114a of the cavity plate 114.

The flange member 132 projects into a space between the bore 113 and a portion of the cavity insert 110. In a sense, the flange member 132 is sandwiched in-between the cavity insert 110 and the walls of the bore 113 in a pocket 134 defined in the cavity plate 114.

In some embodiments of the present invention, the length of the flange member 132 (i.e. a distance from the body of the flange insert 116 where the flange member 132 starts to the distal end thereof) is selected such that the insertion of the flange member 132 into the bore 113 allows for preventing of the tilt of the flange insert 116 relative to the cavity insert 110.

Figure 1:
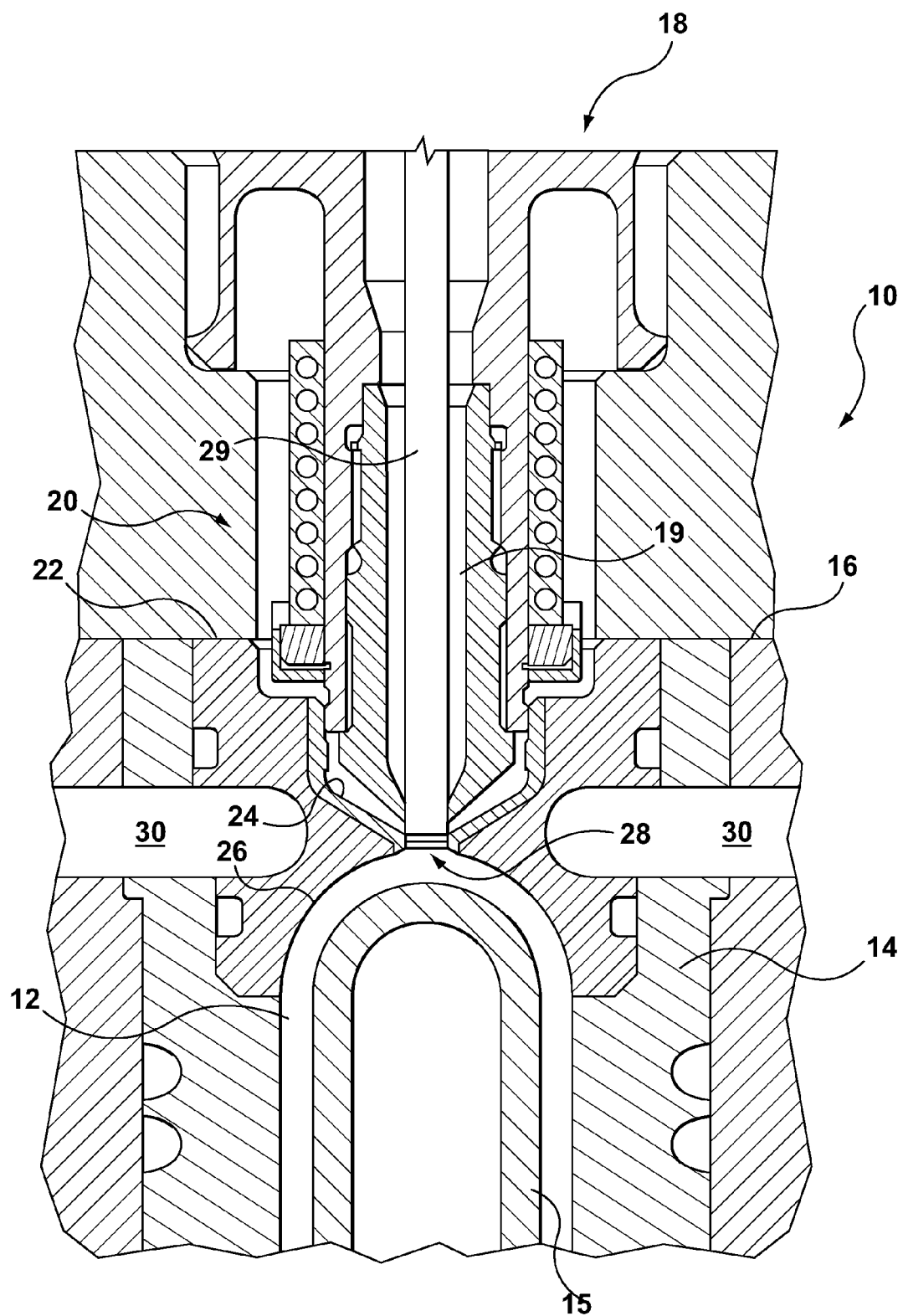
FIG. 1 shows a cross section view of a stationary portion of a prior art injection molding machine.

Given architecture described with reference to FIG. 1, it can be said that all of the gate insert 112, the cavity insert 110 and the flange insert 116 are implemented as "floating stack inserts". Put another way, all three components are allowed a degree of float in an axial direction—i.e. a direction traverse to an operational axis of the mold stack 100. For the avoidance of doubt the operation axis of the mold stack 100 denotes a direction of opening and closing of the mold stack 100.

In effect, during closing of the mold, the floating arrangement of the gate insert 112B, the cavity insert 110 and the flange insert 116 allows for all the components (the gate insert 112, the cavity insert 110 and the flange insert 116) to align themselves by virtue of following one another relative to an alignment master—such as the split mold inserts 118 or the core insert assembly 102.

In operation, during initial stages of mold closing, the flange insert 116 aligns with the split mold inserts 118 along the first interface 124. Through the alignment process, the flange insert 116 starts to move (or float) laterally. This in turn, forces the cavity insert 110 and the gate insert 112 to move and align, as a whole. A technical effect of embodiments of the present invention may include a more uniform thickness of the molded article due at least to better alignment of the mold stack components.

The description of the embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims.

What is claimed is:

1. A mold stack comprising:
    a cavity insert configured to define a portion of a molding cavity for defining a body portion of a preform to be molded therein, the cavity insert positionable, in use, within a bore in a cavity plate in a loose fit arrangement, allowing for a degree of float, in a lateral direction, of the cavity insert relative to the cavity plate;
    a flange insert, positionable in use and at least partially within the bore in the cavity plate in association with the cavity insert, the flange insert is coupled to the cavity plate with a floating retainer structure, whereby the flange insert is provided with a degree of float;
    the flange insert includes a flange member, the flange member projecting away from a mold face (114a) of the cavity plate, the flange member projects into a space between the bore and a portion of the cavity insert, the flange member is sandwiched in-between the cavity insert and the walls of the bore in a pocket defined in the cavity plate;
    the flange insert is positionable, in use, in-between the cavity insert and the bore;
    the mold stack further includes a split mold insert that includes at least a split mold insert pair;
    during initial stages of mold closing, the flange insert aligns with the split mold inserts along a first interface and through an alignment process the flange insert is able to move laterally whereby the cavity insert and a gate insert move and align therewith as a whole.

2. The mold stack of claim 1, wherein a length of the flange member is selected such that the insertion of the flange member into the bore allows for preventing of the tilt of the flange insert relative to the cavity insert.

3. The mold stack of claim 1, wherein the flange insert is coupled to the cavity plate via a flexible retainer structure.

4. The mold stack of claim 1, further comprising a gate insert.

5. The mold stack of claim 4, wherein all of the cavity insert, the flange insert and the gate insert are implemented as compensating stack inserts.

6. The mold stack of claim 1, wherein the cavity insert comprises a first cavity portion and a second cavity portion.

7. The mold stack of claim 6, where one of the first cavity insert portion and the second cavity insert portion is provided with an interface seat and the other one is provided with a cavity insert end portion configured to be positionable within one another.

8. The mold stack of claim 1, wherein the flexible retainer structure comprises a screw that is positionable through a screw seat that in turn is positionable within a bore defined within the flange insert, the screw, the screw seat and a threaded bore defined in the cavity plate are so sized to allow the flange insert a degree of float within boundaries of a gap defined between the flexible retainer structure and the cavity plate.

9. The mold stack of claim 8, wherein the size of the gap defined between the flexible retainer structure and the cavity plate can be between 0.005 mm and 0.04 mm.

* * * * *